United States Patent [19]
Kuzmich et al.

[11] 4,037,674
[45] July 26, 1977

[54] BALANCE FOR DETERMINING THE WEIGHT PERCENTAGE OF AN EXTRACTED COMPONENT WITH RESPECT TO THE TOTAL WEIGHT OF A TEST MATERIAL

[76] Inventors: Valery Konstantinovich Kuzmich, ulitsa Komarova, 10, korpus 3, kv. 12; Yakov Televich Dashevsky, ulitsa Frantsa-Meringa 1, kv. 11, both of Odessa, U.S.S.R.

[21] Appl. No.: 627,039

[22] Filed: Oct. 30, 1975

[51] Int. Cl.² .............. G01G 19/00; G01G 19/04; G01G 1/18
[52] U.S. Cl. ...................................... 177/200; 177/25; 177/32; 177/251
[58] Field of Search .................. 177/25, 32, 200, 246, 177/251

[56] References Cited

U.S. PATENT DOCUMENTS

| 697,318 | 4/1902 | Brown | 177/200 |
|---|---|---|---|
| 1,084,886 | 1/1914 | Katterheinrich et al. | 177/25 X |
| 1,758,648 | 5/1930 | Cameron | 177/200 X |
| 3,545,557 | 12/1970 | Dykstra | 177/251 X |

FOREIGN PATENT DOCUMENTS

| 406,654 | 12/1909 | France | 177/251 |
|---|---|---|---|

*Primary Examiner*—George H. Miller, Jr.

[57] ABSTRACT

Balance for determining weight percentage of an extracted component with respect to the total weight of a given material, comprising two load-receiving units and two movable rigidly connected balance weight interconnected by flexible ties that embrace a drum. As the drum rotates, the load-receiving units and the balance-weights move simultaneously along the beam in opposite directions until the beam is set in equilibrium, at which a vernier position on a linear scale indicates the sought percentage.

1 Claim, 2 Drawing Figures

BALANCE FOR DETERMINING THE WEIGHT PERCENTAGE OF AN EXTRACTED COMPONENT WITH RESPECT TO THE TOTAL WEIGHT OF A TEST MATERIAL

The invention relates to balances and more particularly to a balance for determining the weight percentage of an extracted component with respect to the total weight of the material in question.

Known in the prior art is a balance for determining weight percentage of an isolated component with respect to the total weight of material, comprising a stand, a beam with a non-uniform scale, resting against a stand on a knife-edge, a stationary pan suspended from the beam and located on one side of the stand, a movable pan located on the other side, that can be moved along the beam, adjusting weights located on the beam on the side of the fixed pan, and an arrester located on the other side of the beam.

The balance cannot ensure high accuracy of determining the weight percentage of fibre in cotton, which is due to non-uniformity of the scale and disregarding of the mass of the stationary pan. Moreover, the non-uniform scale increases the dimensions of the balance.

Known in the prior art is also a balance with direct reading of the weight percentage of material components, having a base plate mounting a stand with an edge, a beam resting against the edge, the beam being provided with a percentage reading scale on its longer arm; a compensating unit comprising a lengthwise threaded rod fastened in the upper part of the beam, a counterweight that can move along the rod and is actually a washer whose inner diameter is larger than that of the rod and having a thread in its upper part and a flat base in its lower part; a fixed pan fastened on the short arm of the beam; a moving pan that can be moved along the longer arm of the beam; and a pointer fixed on the beam.

The balance error arising due to the mass of the moving pan is compensated manually; the accuracy of the determination is low due to non-linearity of the reading scale. Moreover, the non-linear scale is difficult to manufacture (complexity of graduation) and increases the total weight of the balance.

Known also is an apparatus for determining percentage yield of cotton fiber, having a housing, a swivel beam mounting a hook to suspend cotton on one end, and a scoop on the other, a rotary and load scale.

The apparatus can only be used to determine percentage content of sought components in certain limited portions of material. Its accuracy with 100 g samples is maximum ± 0.25 percent. The scale readings are limited to 15–60 percent.

The object of this invention is to provide a balance of higher accuracy that can give direct readings of the weight percentage of sought components and obviates any additional calculations; the balance should be easy to manufacture and convenient in use.

The object has been attained in that a balance for determining weight percentage of an isolated component with respect to the total weight of test material is provided, comprising a beam, load-receiving units, and balance weight located on the beam. According to the invention the balance has a linear scale on the beam, two load-receiving units connected by a rigid rod that is provided with a vernier, two balance weight interconnected by a rigid rod, flexible ties interconnecting the movable load-receiving units and the weights, that embrace the drum. As the drum rotates, the load-receiving units and the balance weight move simultaneously along the beam in opposite directions until the beam is set in equilibrium, at which the vernier gives direct readings of the weight percentage.

The proposed balance ensures linearity of the reading scale, and makes it possible to use a vernier to read the weight percentage of the sought component in any portion of the material to an accuracy of 0–1 percent.

For a better understanding of the invention, it will be illustrated by a detailed description of an exemplary, preferred embodiment with reference to the appended drawings in which.

Figure 1:
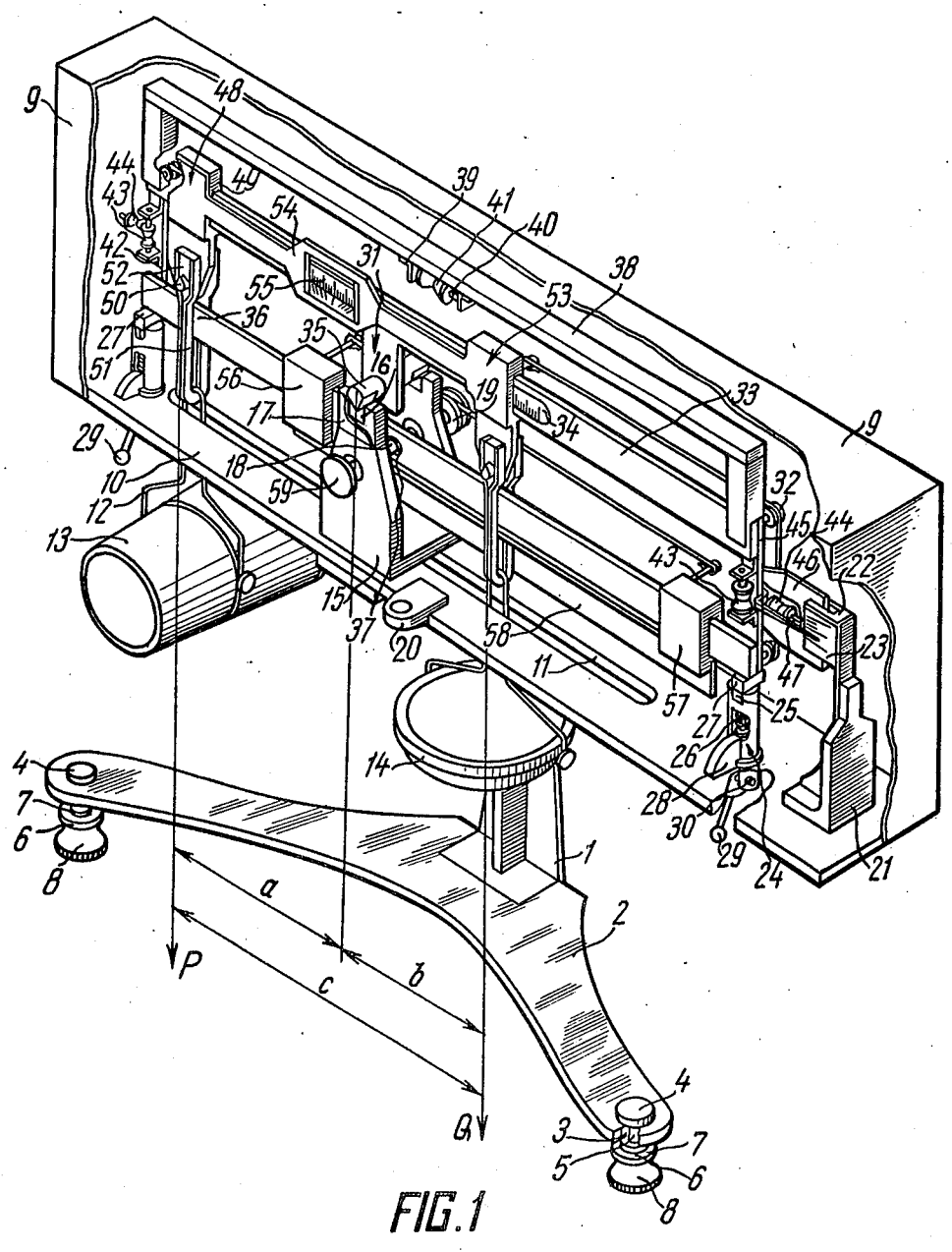
FIG. 1 is a general view of the balance according to the invention.

The balance for determining weight percentage of a sought component in the test material comprises a stand 1 (FIG. 1) fixed on a base plate 2. The base plate has pressed-in threaded bushes 3 through which legs 4 are passed. The legs have threaded axles 5 with fixed rings 6 and locking nuts 7. In the lower part of the axles there are supports 8. A housing 9 is supported on the stand 1. It has a base 10 with two longitudinal slots 11 for suspensions 12 of movable pans 13 and 14.

The base 10 mounts a stand 15 with cradles 16 and limit stops 17. The stand 15 has a hole to pass, freely with a clearance an axle 18 of a drum 19. The base 10 also mounts a level 20 which is a transparent sealed vessel filled with a liquid; a stand 21 is intended to fix a magnetic damper 22 provided with a scale 23 of an equilibrium indicator; an arrester 24 has movable supports 25, springs 26 and a shock absorber 27; a cam 28 with a handle 29 mounted on an axle 30 is hinge-connected to the arrester 24.

A beam 31 is made as a rectangular frame, and has four rollers 32 on each of its corners. The frame consists of an upper horizontal plate 33 with a reading scale 34 and a bearing knife-edge 35; a lower horizontal plate 36 with a bush 37 pressed into it and intended to accept the axle 18 of the drum 19; a connecting plate 38 mounting side plates 39, a threaded axle 40 and calibrating weights 41; a left-hand vertical plate 42 bearing two calibrating members, namely a vertical member 43 and a horizontal member 44; a right-hand vertical plate 45 bearing the two calibrating members 43 and 44, and an index 46 located between the damper 22 poles, provided with an equilibrium index 47.

The beam 31 mounts a first movable load-receiving unit 48 that can be moved along the upper horizontal plate 33. It comprises a weight 49 with a load receiving edge 50 pressed into it, a shackle 51 with cradles 52 and a cup at the pan 13.

A second movable load-receiving unit 53 moves along the upper horizontal plate 33; it is connected with the first movable load-receiving unit 48 by a rigid rod 54 having a vernier 55; left- and right-hand balance weight 56, 57 move along the lower horizontal plate 36, connected through a rigid rod 58. The axle 18 of the drum 19 has a handle 59.

Figure 2:
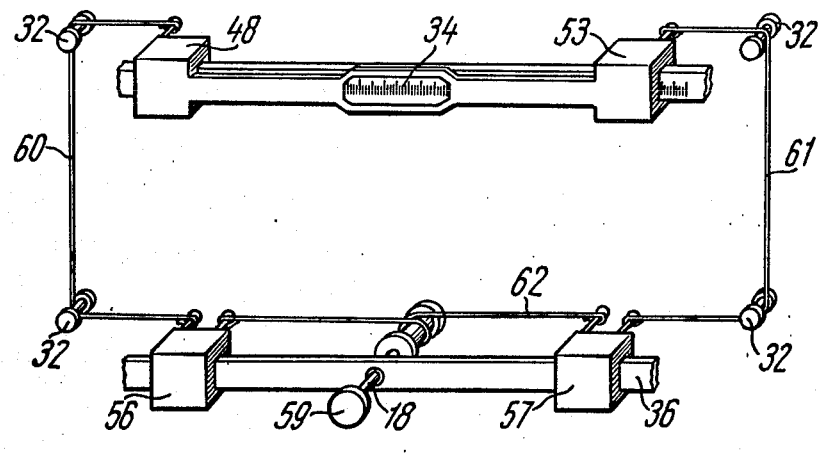
FIG. 2 is a schematic illustration of flexible ties in the balance according to the invention.

The load-receiving unit 48 is connected by a flexible tie 60 (FIG. 2) with the weight 56, the tie passing through the rollers 32. The load-receiving unit 53 is connected with the balance weight 57 by a flexible tie 61 also passing through the rollers 32. The weight 56 is connected with the weight 57 by a flexible tie embracing the drum 19.

The balance operates as follows.

When in the idle (arrested) position, the handle 29 is turned downwards and the beam 31 rests against the shock absorbers 27. The knife-edge 35 is lifted over the bearing cradles 16. To set the balance in the working position, ring 6 is turned to adjust the height of support legs 4 so that the level 20 indicates the horizontal position of the balance. The lock-nuts 7 serve to fix the support legs in the required position.

Now the handle 29 is turned upwards to rotate the cam 28. The movable support 25 moves downwards by the action of the spring 26, the beam 31 is lowered, and the knife-edge 35 of the beam is set against the cradle 16 of the stand 15. The equilibrium of the unloaded beam is checked as follows. The equilibrium index 47 should read zero on the scale 23. If not, the beam 31 is calibrated with members 43 and 44, and also by moving the calibrating weights 41 along the axle 40.

By rotating handle 59 (FIG. 2) the load-receiving units 48 and 53 are moved along the reading scale 34. As the handle 59 is turned, the axle 18 and the drum 19 are turned too, and the flexible tie 62 is wound on one side of the drum and unwound from its other side. This moves the balance weights 56 and 57 along the horizontal plate 36. The flexible ties 60 and 61 move the load-receiving units 48 and 53.

Thus, the system of flexible ties 60, 61 and 62 ensures simultaneous movement of the weights 56 and 57 on one side, and of the load-receiving units 48 and 53 on the other side, in opposite directions, and to equal distance. If pans 13 and 14 are empty, the mass of the moving elements on one horizontal plate 33 is equal to the mass of the weights 56 and 57 on the other horizontal plate 36. The beam 31 remains in equilibrium at any position of the load-receiving units 48 and 58 and the weights 56 and 57.

As soon as the equilibrium of the beam 31 has been checked, the balance is arrested again by turning the handle 29 downwards. The cam 28 is turned, it pushes the moving rest 25, which overcomes the resistance of the spring 26 to move upward, and to lift (through shock absorber 27) the bearing edge 35 from the cradles 16.

In order to determine the weight percentage of an isolated component, it is placed on or in the pan 13 while the remaining material is placed on the pan 14. The balance arrester is released and the load-receiving units 48, 53 and the balance weights 56 and 57 are moved by turning the handle 59 until the beam 31 is set in equilibrium. Now the result is read off the scale 34 and the vernier 55. The accuracy of the scale reading is 1 percent and the vernier reading 0.1 percent. The balance is then arrested.

The high accuracy reading of the weight percentage is attained by the linear design of the scale 34, which makes it possible to use the vernier 55 for taking off readings. The uniformity of the scale is attained by simultaneous movement of the load-receiving units 48 and 53 to equal distances. The equation of the force moment with respect to the bearing knife-edge 35 is as follows (FIG. 1);

$$P(a - l) = Q(b + l) \quad (1)$$

where

P is the weight of the component whose weight percentage is to be determined;

Q is the weight of the remaining material;

$a$ is the distance from the axis of the left pan 13 to the axis of the bearing knife-edge 35, corresponding to the starting position;

$b$ is the distance from the right pan 14 to the axis of the bearing knife-edge 35, corresponding to the starting position; and $l$ is the displacement of the load-receiving units 48 and 53 from the starting position to the equilibrium position of the beam 31 with the pans 13 and 14 respectively loaded with P and Q.

The beginning of the scale corresponds to the axis of the bearing knife-edge 35. Then $$l = nx - b \quad (2)$$

where X is the distance between two neighbouring divisions on the reading scale 34, and n is the number of divisions corresponding to the percent content of the components P/P + Q Substituting (2) into (1), we have $$P(a - nx + b) = Q(b + nx - b) \quad (3)$$

Since $a = c - b$ (4), where c is the distance between the axes of the left and right pans 13, 14 (constant) we have $$P(C - nx) = Qnx \quad (5)$$

whence $$nx = P/(P + Q) \, C \quad (6)$$

Thus, the length of the reading scale from its beginning to the read-off division is proportional to the percentage content of the components P/(P + Q), which proves uniformity of the reading scale 34.

The distance between the divisions is determined from the equation $$X = P/(P + Q) \times C/n \quad (7)$$

For example, for the percentage contents of the components of 50 percent ($Q = P$ and $P/(P + Q) = 0.5$), and for the value of the division of the reading scale 34 of 1 percent, the number of divisions $n = 50$, and the distance between the divisions is $$X = 0.5 \, (C/50) = 0.01 \, C$$

The proposed balance makes it possible to determine the percentage ratio of an isolated component to the total weight of a test material within a wide range of percentage ratios, at high accuracy, the readings being taken directly from the scale, without any additional calculations.

The balance is simple to manufacture and convenient in use.

We claim:

1. A balance for determining the weight percentage of an extracted component with respect to the total weight of a test material, the balance comprising a first moving load-receiving unit to accept the extracted component of a test material, the weight percentage of which is to be determined; a second moving load-receiving unit to accept the remaining mass of the material; a beam in the form of a rectangular frame of two horizontal plates connected by two vertical plates; a support for carrying said beam; a linear scale applied to one of said horizontal plates, to read off the weight percentage; said units being both located on one of said horizontal plates, namely one unit on each side of said support; a first rigid tie-rod rigidly connecting said units; a vernier on said first tie-rod; two movable balance weights on the other of said horizontal plates, namely one weight on each side of said support; a second rigid tie-rod rigidly connecting said weights; a drum; an axle for said drum, fixed in said beam; and flexible ties connecting said drum with said units and with said weights; said units and said weights moving simultaneously along said beam in opposite directions as said drum is turned, until said beam reaches its equilibrium, at which the position of said vernier is used to read off the weight percentage.

* * * * *